Dec. 15, 1959  A. R. KNIGHT  2,917,018
COUPLING MEANS FOR BARGES AND THE LIKE
Filed Feb. 4, 1955  9 Sheets-Sheet 1
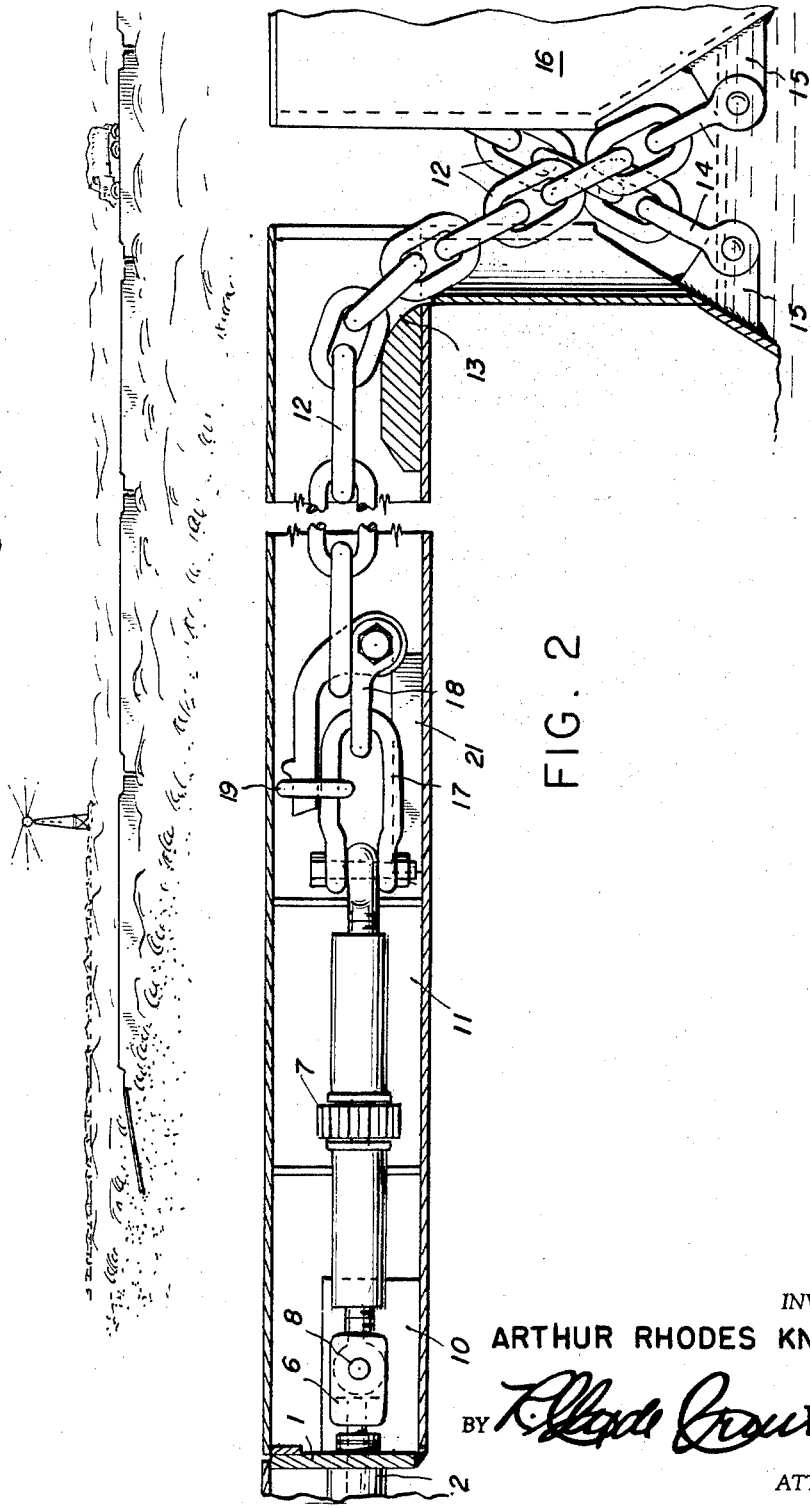
INVENTOR
ARTHUR RHODES KNIGHT
BY
ATTORNEY Dec. 15, 1959     A. R. KNIGHT     2,917,018
COUPLING MEANS FOR BARGES AND THE LIKE
Filed Feb. 4, 1955     9 Sheets-Sheet 2
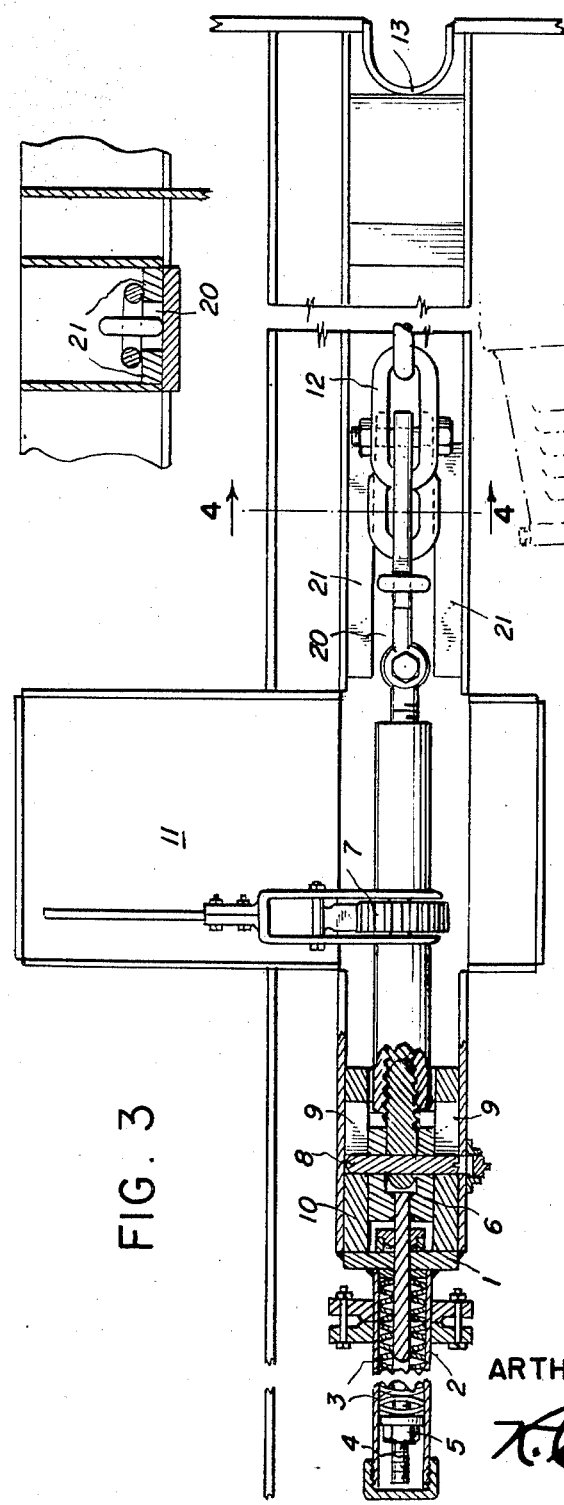
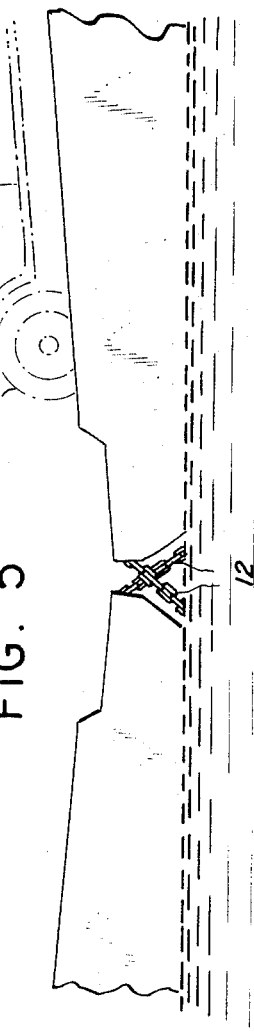
INVENTOR.
ARTHUR RHODES KNIGHT
ATTORNEY Dec. 15, 1959 A. R. KNIGHT 2,917,018
COUPLING MEANS FOR BARGES AND THE LIKE
Filed Feb. 4, 1955 9 Sheets-Sheet 3
FIG. 6
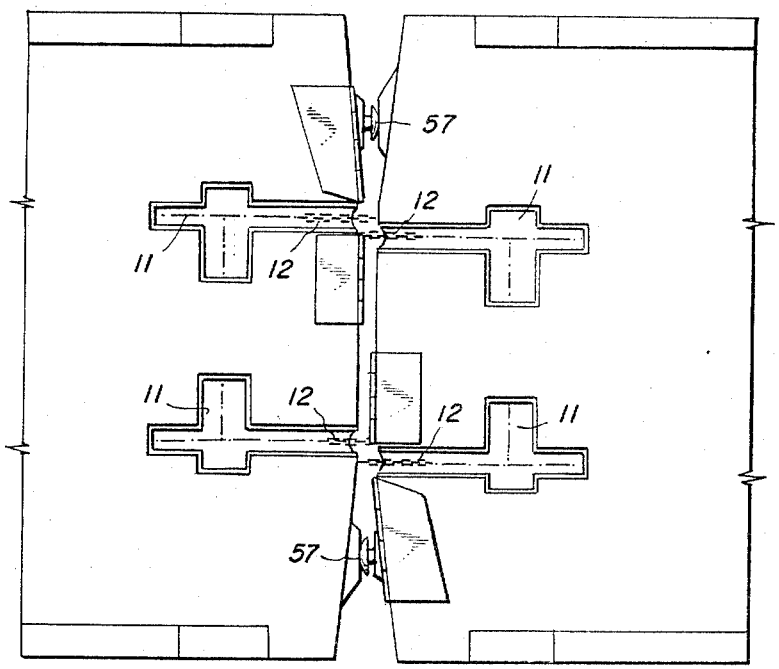
FIG. 8
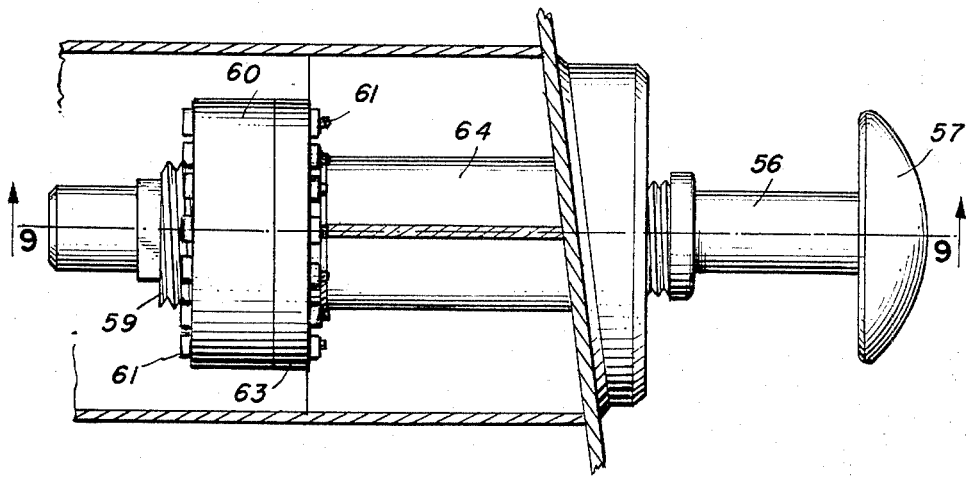
INVENTOR
ARTHUR RHODES KNIGHT
BY 
ATTORNEY Dec. 15, 1959    A. R. KNIGHT    2,917,018
COUPLING MEANS FOR BARGES AND THE LIKE
Filed Feb. 4, 1955    9 Sheets-Sheet 4

INVENTOR
ARTHUR RHODES KNIGHT
BY
ATTORNEY

Dec. 15, 1959     A. R. KNIGHT     2,917,018
COUPLING MEANS FOR BARGES AND THE LIKE
Filed Feb. 4, 1955     9 Sheets-Sheet 5
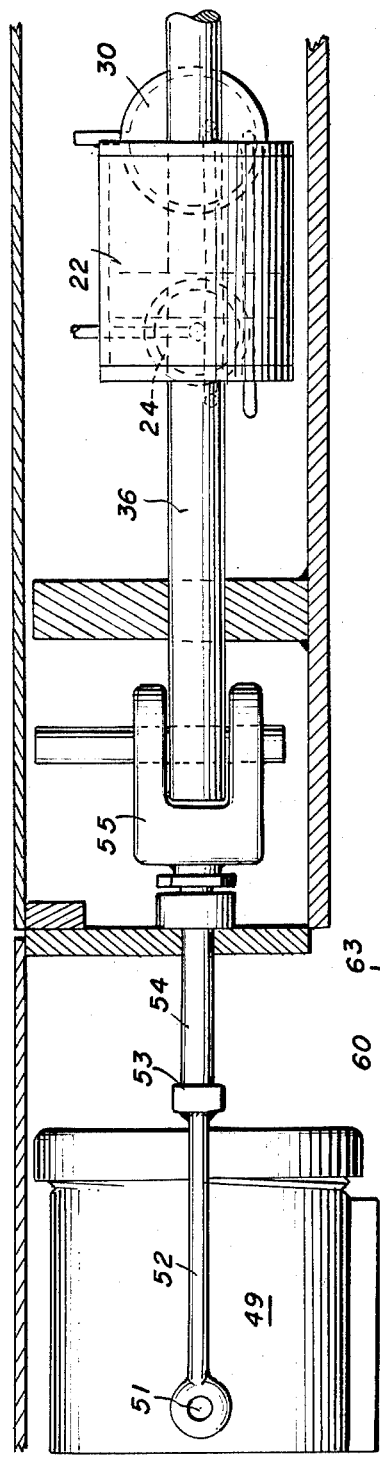
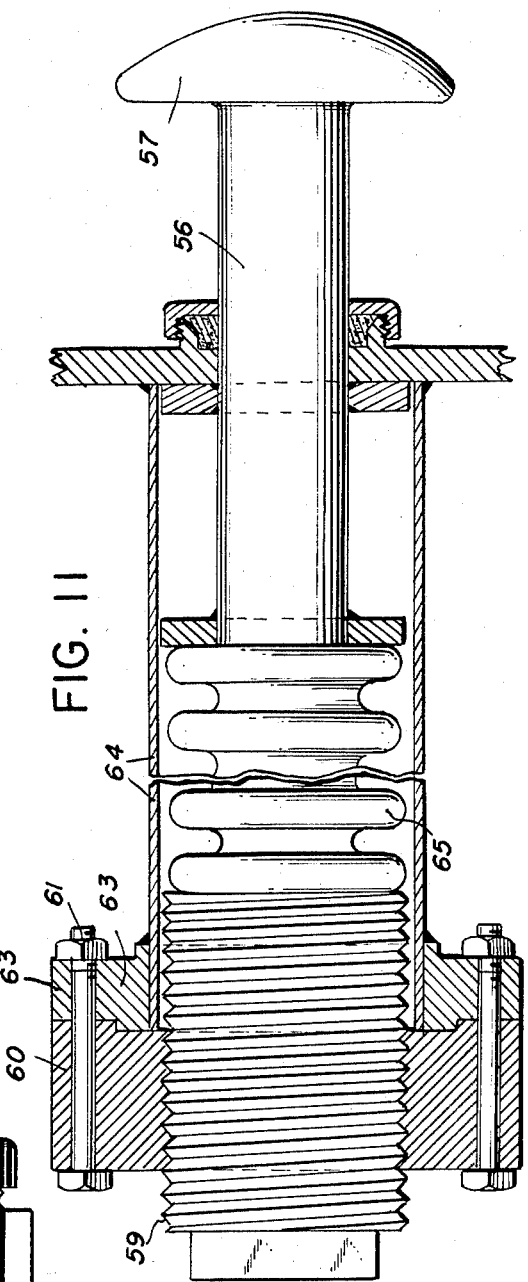
*INVENTOR.*
ARTHUR RHODES KNIGHT Dec. 15, 1959          A. R. KNIGHT          2,917,018
COUPLING MEANS FOR BARGES AND THE LIKE
Filed Feb. 4, 1955          9 Sheets-Sheet 6
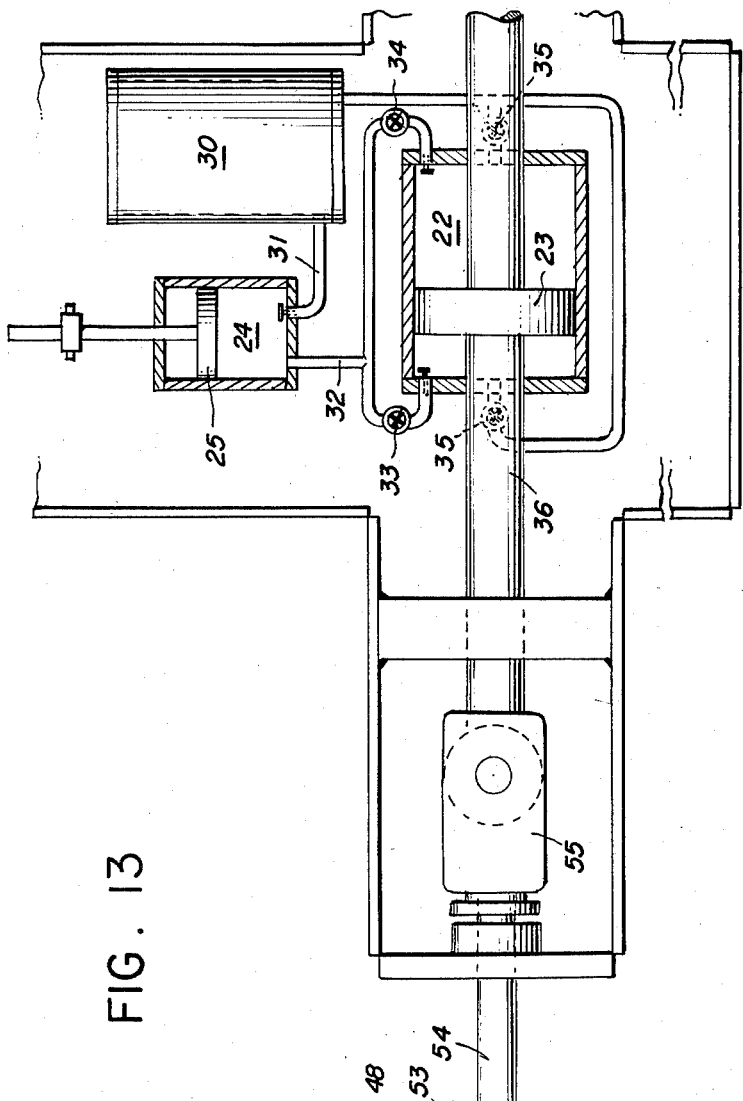
FIG. 13
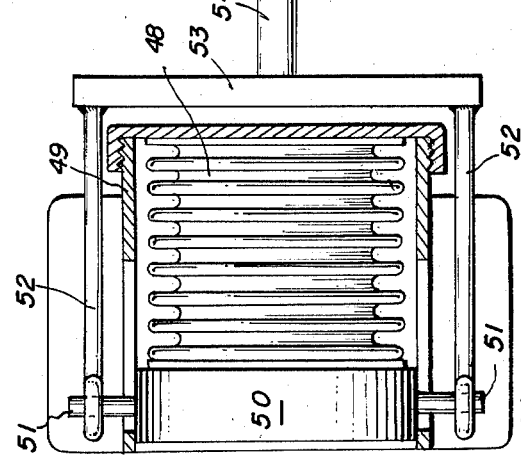
INVENTOR.
A. R. KNIGHT
ATTORNEY Dec. 15, 1959 A. R. KNIGHT 2,917,018
COUPLING MEANS FOR BARGES AND THE LIKE
Filed Feb. 4, 1955 9 Sheets-Sheet 7
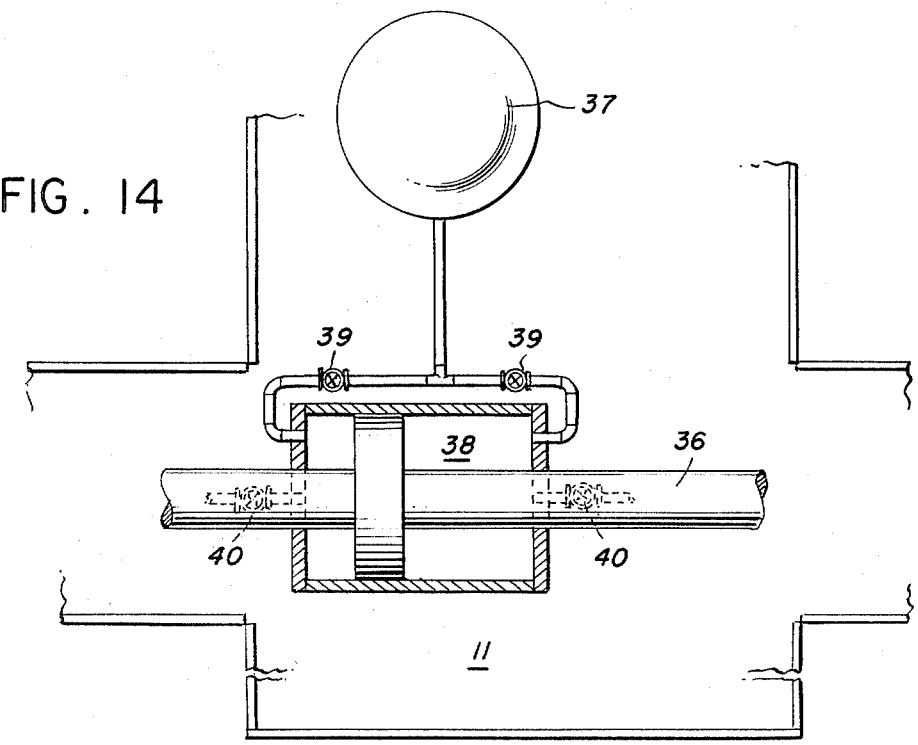
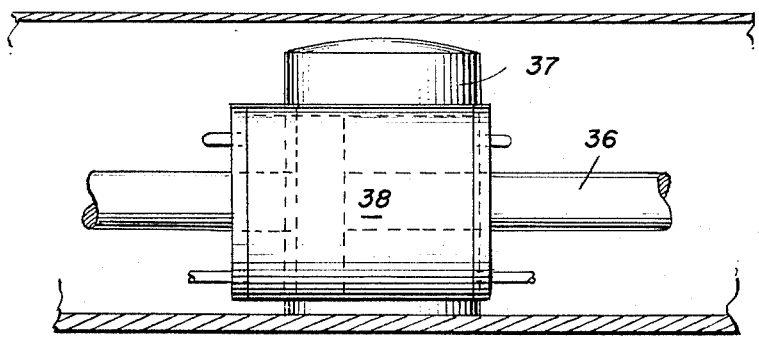
INVENTOR.
ARTHUR RHODES KNIGHT
BY
ATTORNEY

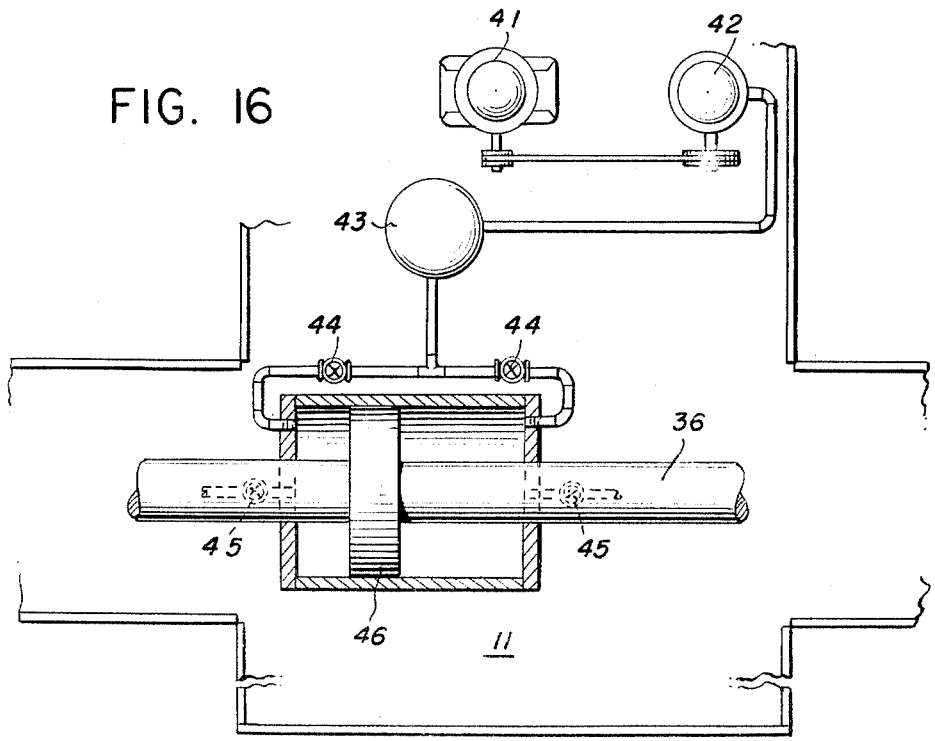
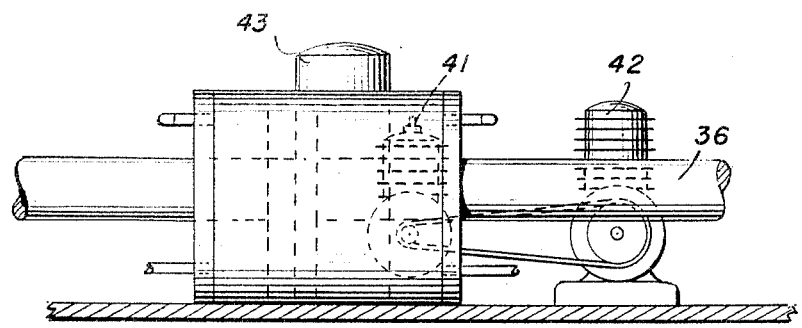

INVENTOR
ARTHUR RHODES KNIGHT

ATTORNEY

United States Patent Office 2,917,018
Patented Dec. 15, 1959

2,917,018

COUPLING MEANS FOR BARGES AND THE LIKE

Arthur Rhodes Knight, Gibson Island, Md.

Application February 4, 1955, Serial No. 486,167

9 Claims. (Cl. 114—235)

This invention relates to an improved method and means for connecting together a pair of barges or individual barges of a train of barges, end to end in such a manner as to provide for the safe and successful moving thereover, from one barge to the next, of extremely heavy vehicles, such as military equipment comprising tanks, guns, trucks and the like.

It is a well known fact today, that in military landings during battle or in preparation therefor, tanks, tractors, trucks, guns and similar heavy military equipment have to be transported by ships and in most cases, from the ships to shore by barges or the like.

These barges are usually connected together to form a floating bridge or roadway, extending from the landing ship to shore and this creates a problem with respect to the connecting together of these barges so that said equipment may travel from one barge to another without disturbing the relative vertical position of the abutting ends of said barges.

As previously stated, this military equipment is extremely heavy and each individual piece might weigh many tons so that it will be apparent that this extreme weight, resting on or passing over one end of a barge, will cause that end to sink much lower in the water than the abutting end of the adjacent barge, so that the ends of said barges will not be at the same level and thus blocking or preventing the smooth passing thereover of the equipment, which would be the case if a conventional flexible coupling or connection between the barges were used.

Furthermore, in moving this heavy equipment over a train of barges, it is necessary that the connecting or coupling means between the barges be such that the excessive or dangerous roll of any one of said barges, due to heavy seas or top-heavy equipment, will be prevented.

The object of the present invention is to provide a connection or coupling between adjacent barges whereby the abutting ends of said barges will be maintained level at all times both vertically and transversely, regardless of the weight of the vehicle or equipment passing from one barge to the other.

Another object is to produce a flexible connection of the type indicated and one that will accommodate itself to the movements of the sea without damage to said connection or barges.

A further object is to provide a coupling or connection between said barges so arranged and constructed that excessive side roll of the individual barges will be prevented.

A still further object is the production of a connection between barges or the like that will be relatively simple to manufacture and assemble and one that can be operated manually or adapted to the use of hydraulic pressure, compressed air or steam.

The preferred embodiment of the invention is illustrated in the accompanying drawings, in which:

Figure 1 is a reduced diagrammatic or perspective view showing a train of barges coupled together extending from shore out to a ship (not shown) for conveying or having driven thereover mobile ordnance, equipment, military tractors, trucks or the like, the purpose of the invention being to maintain the abutting ends of said barges at the same level regardless of the disposition of the weight on said barges or the roughness of the sea.

Figure 2 is an enlarged detail view partly broken away, showing in elevation applicant's improved connection or coupling between the barges.

Figure 3 is a plan view of the structure as shown in Figure 2 with the addition of the cushioning spring element for the inboard end of said connection and also the manually operable ratchet for taking up the initial slack in the chain after coupling operations.

Figure 4 is a sectional view on line 4—4 of Figure 3.

Figure 5 is a view illustrating the relative position of the abutting ends of the coupled barges under weight during actual use.

Figure 6 is a top plan view showing the relative positions of the coupling members and the means of mounting said members in wells below the deck level.

Figure 8 is an enlarged view in plan of one of the end bumpers or buffers shown in operative position in Figure 6, one buffer only being mounted in each end of each barge.

Figure 11 is another form of spring device of the bellows type for use in connection with the same type of bumper.

Figure 12 is a side elevational view of a modification of the inboard end of the coupling device as illustrated in Figure 3 wherein a bellows spring cushioning device is employed in place of the disc spring member as shown in Figure 3.

Figure 13 is a partial sectional view in plan more clearly showing the construction of the bellows spring, these Figures 12 and 13 also showing a modified form of take-up for the chain coupling member wherein hydraulic pressure is used instead of the hand operated "steamboat ratchet" as shown in Figures 2 and 3.

Figures 14 and 15 show further modifications for the initial take-up of the chain connection, using steam pressure apparatus.

Figures 16 and 17 illustrate a still further modification using compressed air apparatus.

Figure 9:
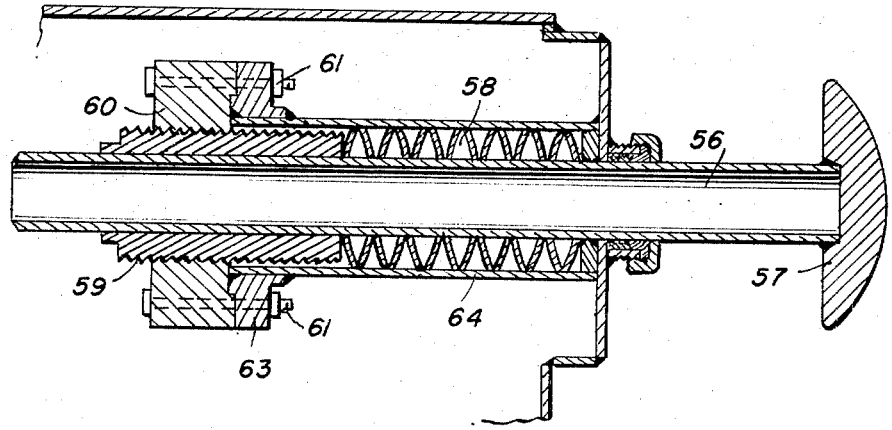
Figure 9 is a sectional view showing one type of spring device together with screw means for adjusting said spring device.
Figure 10:
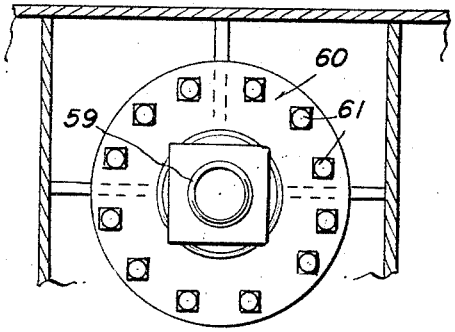
Figure 10 is a rear end view of the device as illustrated in Figure 9.

Generally stated, the present invention comprises two main or basic units, to wit, a flexible connecting member and a cushioned bumper and a novel means or method of using said connecting member.

Throughout the detailed description to follow, these flexible coupling members will be described in connection with the use of chains but it is to be understood that steel cables or the like can also be used in place of chains.

Also, in the detailed description the floats or vessels will be defined as barges but this is to be considered as a broad term and to cover any type of floating vessel that may be adaptable to the present invention.

Referring to the drawings in detail and with particular reference to Figures 2 and 3, the improved coupling or connection is secured at its inboard end to a rigid part 1 of the barge or vessel by a spring device 2 comprising, in the form illustrated in Figure 3, a series of coupled discs 3, said spring device including a rod 4 passing through the centers of the various discs and adjustably secured therein by a nut or the like 5.

The opposite end of this rod 4 is secured to a shackle or clevis 6 which in turn is fastened to one end of a turn-buckle or "steamboat ratchet" 7 by a pivot pin 8, said pin 8 being guided in its reciprocatory motion in slots 9 formed in oppositely disposed plates or the like 10 mounted within the inner end of the well generally designated as 11, said well being formed in the deck and extending below the deck level.

To the other end of the turn buckle 7 is secured the inner end of the coupling chain 12, said chain extending to and passing over the end of the barge through a chock 13 and then downwardly to a point well below the deck line. The extreme outer or lower end of this chain 12 (see Figure 2) is connected by a shackle 14 or the like to a bracket 15 carried by the adjoining abutting barge 16. The inner end of this chain 12 is secured to the eye of the turn buckle or "steamboat ratchet" 7 by a combination shackle 17 and releasable latch or the like 18, said latch being locked in closed position by a ring-like member 19 in a well known manner.

Referring to Figures 2, 3 and 4, the shackle 17 is maintained in vertical position and guided in a slot 20 formed by two oppositely disposed plates or the like 21 positioned in the bottom of the well 11. It is to be understood that this well 11 is of the form clearly shown in Figure 6 and there are two of these wells formed in each end of each barge.

It is also to be noted that whereas the end of each barge carries only one bumper, the flexible connection between the barges comprises four sets of chains and associated mechanism, which is also more clearly shown in Figure 6, each chain unit, however, being identical.

In place of the hand operated "steamboat ratchet" 7, which is for the purpose of taking up the initial slack in the chains, to draw the barges together, other means may be substituted when convenient such as compressed air, steam pressure or hydraulic pressure as illustrated in Figures 12 to 17, inclusive.

With particular reference to Figures 12 and 13, the hydraulic mechanism there shown comprises a hydraulic cylinder 22 provided with a piston 23 and an auxiliary cylinder 24 which is in turn provided with a driven piston 25, said cylinder 24 being connected to a receiver 30. The receiver 30 is partially filled with hydraulic fluid and upon the working of the piston 25, this fluid is withdrawn from the receiver 30 through a valve pipe 31 and forced through pipe 32 to either end of the cylinder 22 according to the manipulation of the valves 33, 34 and 35 depending upon which way it is desired to move the piston 23 in the operation of the device. This piston 23 is carried by a rod 36 which in turn is secured to the inner end of the chain 12 (not shown in this Figure 13), the rod 36 and its piston 23 being equivalent to the "steamboat ratchet" mechanism, illustrated in Figures 2 and 3.

In Figures 14 and 15 there is provided a steam boiler 37 which communicates with a cylinder 38 by way of valves 39, said cylinder being provided also with exhaust valves 40. It is thought unnecessary to describe this modification in detail as it functions substantially the same as the power device shown in Figure 13.

Figures 16 and 17 show a similar arrangement for using compressed air comprising a motor 41 driving a compressor 42 for charging a pressure tank 43. A proper manipulation of the valves 44 and 45 will move the piston 46 in the desired direction either for the purpose of taking up slack in the chain to which the shaft 36 is connected, or slacking off the chain by operation of the exhaust valves 45.

In place of the cupped disc spring arrangement as shown in Figure 3, there may be substituted therefor the type of bellows spring 48 as shown in Figures 12 and 13. This bellows spring 48 is mounted within a cylinder 49 and is provided with a base member 50 which in turn is provided with trunnions 51 connected by rods 52 to a cross head member 53. This cross head member 53 is provided with a rod or shaft 54 which is in turn connected to the shaft 36 by a shackle or the like 55. This shaft 36 of the power device is employed for the purpose of taking up the initial slack in the connecting chain 12 (not shown in this figure), having its inner end connected to the outer end of this shaft 36 in the same manner as it is connected to the "steamboat ratchet" device illustrated in Figure 3.

Figures 8, 9, 10 and 11 illustrate two forms of bumpers adapted for use in connection with the present hookup connection. One of these bumpers is carried by each end of the abutting barges as clearly shown in Fig. 6. These bumpers are either carried by the right side or the left side of each barge but so arranged that they will be on their proper side when the barges are arranged end to end.

In the type as illustrated in Figure 9, these bumpers are formed with a tubular member 56 carrying a solid head 57 and said tubular member 56 passes through a series of cupped disc-like members comprising a spring device 58, said spring device being backed up and adjusted by a screw plug 59 which screw plug is threaded into a header 60 secured by bolts 61 to a flange 63 welded to a tubular member 64 which encloses the disc spring.

Another type of spring buffer or bumper is illustrated in Figure 11, the only difference being in the type of spring. In this instance, the spring 65 is of the bellows type but otherwise this construction is similar to that shown in Figure 9 using the same enclosing cylinder 64, adjusting screw plug 59, header 60 and flange 63, said header and flange being connected together by bolts 61.

Figure 7:
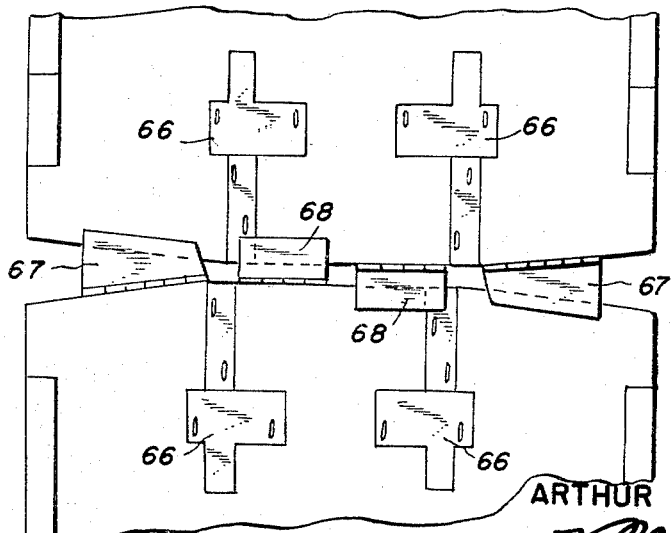
Figure 7 shows the manner of covering these wells and also the bridge plates extending from one barge to the other permitting the easy passage of the vehicles from one barge to the other.

In Figure 6 of the drawings the wells 11 are shown open but after the necessary adjustments and connections are made, these wells are closed over by hinged cover plates 66 as shown in Figure 7 and, as also shown in this figure, the openings between the ends of the barges are bridged by hinged plates 67 and 68 to facilitate the moving of the vehicle from one barge to the next.

In operation, the barges one by one are brought together end to end and the lower ends of the cross chains are connected in the manner as shown in Figure 2 after which the initial slack in said chains is taken up by either the hand "steamboat ratchet" or the various power devices as previously described, after which these chains are then under tension of the spring device secured to the inboard end of the ratchet mechanism or the like. These springs will permit a certain amount of flexibility caused by the usual motions at sea but are of sufficient strength to prevent any unnecessary slacking of these chains so that the deck lines of the abutting barges will at all times be maintained level regardless of the amount of weight distributed on any one barge as illustrated in Figure 5 of the drawings of this application. A pull down on the end of one barge will also pull down the abutting end of the adjacent barge and vice versa, so that uninterrupted travel of vehicles from one barge to the next barge will be unobstructed and these coupling chains will also maintain the abutting ends of these barges in line irrespective of roll or transverse twist.

Figure 18:
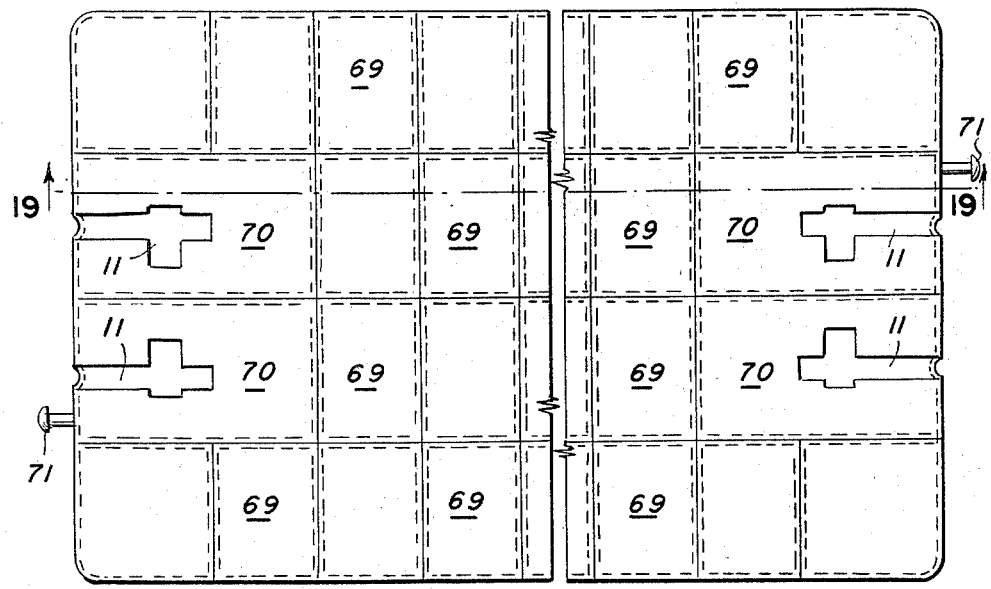
Figures 18, 19 and 20 show diagrammatically the use of the present invention as applied to an assembled or sectional type of barge, said barge being made up of a number of pontoons or tanks appropriately connected together to form barges of various sizes.
Figure 19:
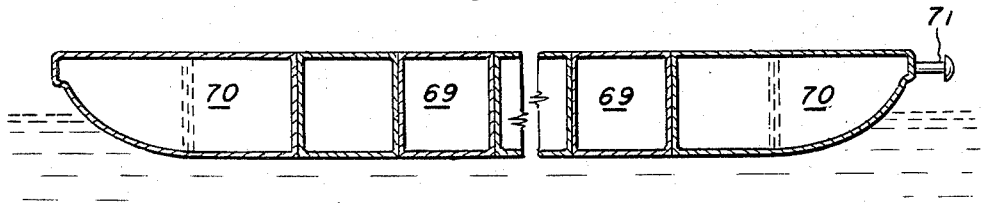
Figure 20:
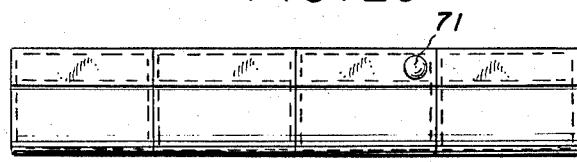

Referring to Figures 18, 19 and 20, there is illustrated more or less diagrammatically a barge made up of separate and independent small units, said units being secured together in any approved manner. These units are sometimes called tanks or cells.

This type of barge is also adaptable to the present invention by constructing certain of the end units of sufficient size to accommodate the mechanism and devices as hereinbefore described.

The conventional smaller units are designated as 69 and the enlarged units as 70. These enlarged units will be provided with the same type of well 11 in which will be mounted the form of connection or connecting device as described with respect to a single unit barge. These larger units 70 will also carry bumpers 71 similar to those previously described.

As hereinbefore stated, applicant is not to be restricted to the specific elements or means employed to accomplish the desired result as other means may be employed to perform the same functions and method within the scope of this invention, as covered by the appended claims.

What I claim is:

1. The combination with two or more floating vessels or barges arranged in substantially abutting relationship, of laterally spaced, longitudinally arranged, couplings extending from one barge to the next abutting barge, each coupling comprising two separate connecting members, one carried by each barge, and each connecting member having one of its ends connected to the deck of its respective barge and its other end passing over the edge of the deck and connected to its adjacent barge at a point lower than the deck of said adjacent barge.

2. The combination with two or more floating vessels or barges arranged in substantially abutting relationship, of laterally spaced, longitudinally arranged, couplings extending from one barge to the next abutting barge, each coupling comprising two separate connecting members, one carried by each barge, and each connecting member having one of its ends connected to the deck of its respective barge and its other end passing over the edge of the deck and connected to its adjacent barge at a point lower than the deck of said adjacent barge, said lower connecting ends crossing each other as they extend downwardly between said barges.

3. The combination with two or more floating vessels or barges arranged in substantially abutting relationship, of laterally spaced, longitudinally arranged, couplings extending from one barge to the next abutting barge, each coupling comprising two separate connecting members, one carried by each barge, and each connecting member having one of its ends connected to the deck of its respective barge and its other end passing over the edge of the deck and connected to its adjacent barge at a point lower than the deck of said adjacent barge, said lower connecting ends crossing each other in a vertical plane as they extend downwardly between said barges.

4. The combination with two or more floating vessels or barges arranged in substantially abutting relationship, of laterally spaced, longitudinally arranged, couplings extending from one barge to the next abutting barge, each coupling comprising two separate connecting members, one carried by each barge, and each connecting member having one of its ends connected to the deck of its respective barge and its other end passing over the edge of the deck and connected to its adjacent barge at a point lower than the deck of said adjacent barge, said lower connecting ends crossing each other in a vertical plane as they extend downwardly between said barges, and cushioned buffers between said barges.

5. The combination with two or more floating vessels or barges arranged in substantially abutting relationship, of laterally spaced, longitudinally arranged, couplings extending from one barge to the next abutting barge, each coupling comprising two separate connecting members, one carried by each barge and each connecting member having one of its ends connected to an adjustable device on the deck of its respective barge and its other end passing over the edge of the deck and positively connected to its adjacent barge at a point lower than the deck of said adjacent barge, and each adjustable device providing means for manually taking up and slacking off said adjustable end.

6. The combination with two or more floating vessels or barges arranged in substantially abutting relationship, of laterally spaced, longitudinally arranged, couplings extending from one barge to the next abutting barge, each coupling comprising two separate connecting members, one carried by each barge and each connecting member having one of its ends connected to an adjustable device on the deck of its respective barge and its other end passing over the edge of the deck and positively connected to its adjacent barge at a point lower than the deck of said adjacent barge, and each adjustable device providing power actuated means for taking up and slacking off said adjustable end.

7. The combination with two or more floating vessels or barges arranged in substantially abutting relationship, of laterally spaced, longitudinally arranged, couplings extending from one barge to the next abutting barge, each coupling comprising two separate connecting members, one carried by each barge and each connecting member having one of its ends connected to an adjustable device on the deck of its respective barge and its other end passing over the edge of the deck and positively connected to its adjacent barge at a point lower than the deck of said adjacent barge, and each adjustable device providing means associated with said adjustable end for maintaining said connecting member under working tension in its adjusted position.

8. The combination with two or more floating vessels or barges arranged in substantially abutting relationship, of laterally spaced, longitudinally arranged, couplings extending from one barge to the next abutting barge, each coupling comprising two separate connecting members, one carried by each barge and each connecting member having one of its ends connected to an adjustable device on the deck of its respective barge and its other end passing over the edge of the deck and positively connected to its adjacent barge at a point lower than the deck of said adjacent barge and each adjustable device providing means for taking up slack in said connecting members, and for maintaining said connecting members under working tension after adjustments.

9. The combination with two or more floating vessels arranged in substantially abutting relationship, of a pair of vertically crossed chains at each side of the abutting ends of said vessels for connecting said vessels, one end of each pair being connected to the decks of the abutting vessels and the other crossed ends connected to the abutting ends of said vessels at points below the deck level of said vessels.

References Cited in the file of this patent

UNITED STATES PATENTS

| | | |
|---|---|---|
| 1,520,144 | Sansom | Dec. 23, 1924 |
| 2,055,369 | Warren | Sept. 22, 1936 |
| 2,321,677 | Higgins | June 15, 1943 |
| 2,346,505 | Preuss | Apr. 11, 1944 |
| 2,397,155 | Rauch | Mar. 26, 1946 |
| 2,699,586 | Dorsey et al. | Jan. 18, 1955 |